(12) United States Patent
Haag et al.

(10) Patent No.: US 7,979,203 B2
(45) Date of Patent: Jul. 12, 2011

(54) METHOD FOR OPERATING A NAVIGATION DEVICE

(75) Inventors: Dominik Haag, Bamberg (DE); Christian Schliermann, Würzburg (DE)

(73) Assignee: Navigon AG, Hamburg (DE)

(*) Notice: Subject to any disclaimer, the term of this patent is extended or adjusted under 35 U.S.C. 154(b) by 743 days.

(21) Appl. No.: 12/100,740

(22) Filed: Apr. 10, 2008

(65) Prior Publication Data

US 2008/0262722 A1    Oct. 23, 2008

(30) Foreign Application Priority Data

Apr. 19, 2007 (DE) .................. 10 2007 018 880
Apr. 27, 2007 (DE) .................. 10 2007 020 434

(51) Int. Cl.
*G01C 21/30* (2006.01)
*G01C 21/32* (2006.01)

(52) U.S. Cl. .......... 701/208; 701/36; 701/211; 701/213; 342/357.21; 342/357.25; 342/357.52; 340/996

(58) Field of Classification Search .................. 701/208, 701/213, 211, 36; 342/357.25, 357.21, 357.52; 340/996
See application file for complete search history.

(56) References Cited

U.S. PATENT DOCUMENTS

| | | | |
|---|---|---|---|
| 5,561,602 A * | 10/1996 | Bessler et al. | 701/1 |
| 6,108,602 A * | 8/2000 | Bairamis | 701/208 |
| 6,314,352 B1 * | 11/2001 | Kunimatsu et al. | 701/36 |
| 6,343,869 B1 * | 2/2002 | Kobayashi | 362/37 |
| 6,411,894 B2 * | 6/2002 | Yamamoto et al. | 701/208 |
| 2001/0007967 A1 * | 7/2001 | Yamamoto et al. | 701/208 |
| 2008/0262722 A1 * | 10/2008 | Haag et al. | 701/208 |

FOREIGN PATENT DOCUMENTS

| | | | |
|---|---|---|---|
| DE | 196 19 643 | * | 5/1996 |
| EP | 0 970 832 A | | 1/2000 |
| JP | 8-353999 | * | 12/1996 |
| JP | 10-304587 | * | 10/1998 |
| KR | 2007096321 A | * | 10/2007 |

(Continued)

OTHER PUBLICATIONS

First results of ground moving target analysis in TerraSAR-X data; Suchandt, S.; Runge, H.; Eineder, M.; Breit, H.; Kotenkov, A.; Balss, U.; Geoscience and Remote Sensing Symposium, 2007. IGARSS 2007. IEEE International; Digital Object Identifier: 10.1109/IGARSS.2007.4423710; Publication Year: 2007 , p. 3943.*

(Continued)

*Primary Examiner* — Cuong H Nguyen
(74) *Attorney, Agent, or Firm* — Quarles & Brady LLP

(57) ABSTRACT

A method for operating a navigation device including a processor, a signal receiver for receiving position signals, a road network database that also contains position data on tunnels (tunnel attributes), a position finding unit that determines the current position of the vehicle, a display unit and a display control for controlling the adjustments of the display unit, particularly for regulating the brightness and/or a color scheme of the display unit. The display control is able to change the adjustment of the display unit while driving through a tunnel (tunnel mode). The method can include determining the vehicle position with consideration of the received position signals and automatically activating the tunnel mode of the display unit by means of the display control immediately or with a certain time delay if the determined vehicle position features a tunnel attribute and the received position signals fall short of a predetermined signal quality.

23 Claims, 3 Drawing Sheets

FOREIGN PATENT DOCUMENTS

WO     PCT/JP99/03655    *   7/1999

OTHER PUBLICATIONS

Timing experiment with geodetic GPS receiver; Banerjee, P.; Becker, D.; Thiel, K.-H.; Hartl, P.; Instrumentation and Measurement, IEEE Transactions on; vol. 43 , Issue: 5 ; Digital Object Identifier: 10.1109/19.328899 Publication Year: 1994 , pp. 700-705.*

A quality control approach for GPS-based automatic vehicle location and navigation systems; Abousalem, M.A.; Krakiwsky, E.J.; Vehicle Navigation and Information Systems Conference, 1993., Proceedings of the IEEE-IEE; Digital Object Identifier: 10.1109/VNIS.1993.585673; Publication Year: 1993 , pp. 466-471.*

Safety Evacuation Measures in Urban Subway Fire; Tan Jialei; Wang Tong; Chen Ya; Bai Guang; Intelligent Computation Technology and Automation, 2009. ICICTA '09. Second International Conference on; vol. 4; Digital Object Identifier: 10.1109/ICICTA.2009.817; Publication Year: 2009 , pp. 422-425.*

Accuracy Analysis of Geo-Referencing by Vehicle-Borne Position and Orientation System in Laser Scanning; Ruofei Zhong; Yongwei Kang; Weibing Feng; Jianxi Huang; Geoscience and Remote Sensing Symposium, 2008. IGARSS 2008. IEEE International; vol. 2; Digital Object Identifier: 10.1 109/IGARSS.2008.4779199; Publication Year: 2008 , pp. II-11.*

High accuracy navigation and landing system using GPS/IMU system integration; Meyer-Hilberg, J.; Jacob, T.; Position Location and Navigation Symposium, 1994., IEEE; Digital Object Identifier: 10.1109/PLANS.1994.303327; Publication Year: 1994 , pp. 298-305.*

Model Predictive Control for Vehicle Guidance in Presence of Sliding: Application to Farm Vehicles Path Tracking; Lenain, R. et al., Automation, 2005. ICRA 2005. Proceedings of the 2005 IEEE International Conf. on; Digital Object Identifier: 10.1109/ROBOT.2005.1570229; Publication Year: 2005 , pp. 885-890.*

* cited by examiner

METHOD FOR OPERATING A NAVIGATION DEVICE

CROSS-REFERENCE TO RELATED APPLICATION

This application claims the priority benefit of German Patent Application No. 10 2007 018 880.5 filed on Apr. 19, 2007, and this application also claims the priority benefit of German Patent Application No. 10 2007 020 434.7 filed on Apr. 27, 2007, the contents of which are hereby incorporated by reference as if fully set forth herein in their entirety.

STATEMENT CONCERNING FEDERALLY SPONSORED RESEARCH OR DEVELOPMENT

Not applicable.

FIELD OF THE INVENTION

The invention pertains to a method for operating a navigation device, and more particularly, to a method for operating a navigation device including a tunnel mode.

BACKGROUND OF THE INVENTION

Navigation devices of the generic type are used, in particular, but by no means exclusively, in the form of mobile or permanently installed navigation devices in motor vehicles. The user has the option of inputting a destination, wherein the navigation device determines the current position of the motor vehicle by evaluating GPS-signals and subsequently directs the driver to the destination. Navigation devices of the generic type are equipped with a road network database that contains information on usable road segments. Navigation devices of the generic type, in particular, contain a road network database that also contains position information on tunnels. This tunnel position data is, in a general sense, referred to as tunnel attributes that are usually assigned to road segments.

When using tunnels, one encounters the problem that a very fast drop in the ambient luminous intensity occurs during the entry into the tunnel, particularly during daylight in the surroundings outside the tunnel. The much weaker ambient light in the tunnel may lead to a glare effect because the display unit of the navigation device which is usually realized in the form of an LCD monitor is adjusted to a luminous intensity or a color scheme that also makes it possible to recognize the road map and the position of the vehicle in daylight.

Various strategies for preventing this glare effect are known from the state of the art. DE 196 19 643 C1 describes a manual brightness control that enables the user to manually change the adjustment of the display unit to the requirements while driving through a tunnel by issuing corresponding user commands. This manual activation of the tunnel mode of the display unit has the disadvantage that it requires a substantial user input, particularly in very short tunnel sections, such that the unit is frequently not changed over and the excessively bright adjustment of the display results in a glare effect that impairs traffic safety while the vehicle drives through the tunnel. In addition, a manual change of the adjustment of the display unit requires much of the user's attention such that the user is distracted from the actual traffic events and, in turn, also impairs traffic safety. However, traffic safety is of particular importance in tunnels due to the higher risk of potentially severe traffic accidents.

As an alternative to the manual change-over of the display unit into a tunnel mode, there also exist initial solutions, in which the navigation device measures the ambient light intensity with a light sensor and varies the adjustments of the display unit in dependence on the measured ambient light intensity. For example, the brightness of the display can be increased in bright daylight and automatically decreased, for example, during nighttime hours or in a tunnel, based on the measuring signals of the light sensor. The utilization of a light sensor, however, has the disadvantage of additional hardware expenses. Furthermore, the integration of a light sensor into the hardware is not possible in some devices, for example, in mobile telephones or PDAs. In addition, the light sensor may result in faulty adjustments because the light sensor is constantly active and subject to interferences, for example, the dimmed headlights of oncoming vehicles, the tunnel lighting system or the interior lighting system of the vehicle. Consequently, it is hardly possible to adjust or program the light sensor such that it correctly adjusts the display brightness at the desired time only. A navigation device with light sensor is described, for example, in DE 32 45 299 A1 and DE 199 27 434 A1.

DE 196 19 643 C1 furthermore describes a strategy, according to which the tunnel mode is always activated when the current vehicle position is identified as a location that lies in a tunnel. This solution has the disadvantage that the tunnel attributes stored in the road network database are frequently not sufficiently accurate or definite. For example, data compression may cause tunnels and bridges to be provided with a common attribute (brunnel) such that the allocation of tunnels is no longer readily possible. In addition, semi-open tunnels or so-called galleries also carry the tunnel attribute, but do not require a change-over of the display unit to the tunnel mode because sufficient ambient light is incident through the gallery. Another major problem of systems in which the display unit is changed over into the tunnel mode based solely on the determined vehicle position and its identification as a tunnel can be seen in that the vehicle position in the tunnel needs to be extrapolated due to the lacking GPS signal if no other position finding sensors are available. The extrapolation preferably is carried out such that a vehicle position on a calculated route is assumed based on marginal conditions such as, for example, the speed before the GPS-signal is lost, the speed limit, the geometry of the map elements on which the vehicle travels, as well as the calculated route, wherein this vehicle position is then additionally processed in the navigation device in the form of an extrapolated GPS-position. This extrapolation of the vehicle position naturally has certain inaccuracies such that the actual vehicle position can significantly deviate from the extrapolated vehicle position. This deviation, in turn, results in the premature or delayed deactivation of the tunnel mode at the tunnel exit.

SUMMARY OF THE INVENTION

The present invention provides a method for operating a navigation device, in which the above-described problems with the activation or deactivation of the tunnel mode of the display unit may be prevented.

An embodiment of the invention is method for operating a device, particularly a navigation device for a motor vehicle, the device comprising a processor, a signal receiver for receiving position signals, particularly GPS-signals, a road network database that also contains position data on tunnels (tunnel attributes), a position finding unit that determines the current position of the vehicle, a display unit and a display control for controlling the adjustments of the display unit, particularly for regulating the brightness and/or a color scheme of the display unit. The display control can change the adjustment of the display unit while driving through a tunnel (tunnel mode). The method can include the steps of determining the vehicle position with consideration of the received position signals and automatically activating the tunnel mode of the display unit by means of the display control immediately or with a certain time delay if the determined vehicle position features a tunnel attribute and the received position signals fall short of a predetermined signal quality. The tunnel mode of the display control can be automatically deactivated when the navigation device is restarted and/or when the navigation device is activated from the standby-mode. The display control can activate the adjustments of the display unit that applied before the last activation of the tunnel mode after the tunnel mode is deactivated. The adjustments of the display unit while driving through a tunnel (tunnel mode) can correspond to the adjustments of the display unit during nighttime hours (nighttime mode) and/or that the tunnel mode cannot be activated when the vehicle enters a tunnel while the nighttime mode is activated and/or that the tunnel mode cannot be deactivated when the vehicle exits a tunnel while the nighttime mode is activated. Only the brightness of the display unit can be regulated when activating the nighttime mode. The tunnel mode of the display unit can be deactivated by the display control immediately or with a certain time delay if the received position signals exceed a predetermined signal quality and the determined vehicle position no longer features a tunnel attribute. The vehicle position in the tunnel can be determined without evaluating position signals by means of an extrapolation method and/or by evaluating other sensors, wherein the tunnel mode of the display unit is deactivated by the display control immediately or with a certain time delay if the vehicle position determined by means of extrapolation no longer features a tunnel attribute and the received position signals exceed a predetermined signal quality. The tunnel mode of the display unit can be deactivated by the display control immediately or with a certain time delay if the received position signals exceed a predetermined signal quality and the determined vehicle position can not taken into account in the deactivation of the tunnel mode. The tunnel mode of the display unit can be deactivated by the display control immediately or with a certain time delay if the determined vehicle position no longer features a tunnel attribute and the received signal quality of the position signals can not taken into account in the deactivation of the tunnel mode. The vehicle position in the tunnel can be determined without evaluating position signals by means of an extrapolation method and/or by evaluating other sensors. The tunnel mode of the display unit can be deactivated by the display control immediately or with a certain time delay if the vehicle position determined by means of extrapolation or by evaluating other sensors no longer features a tunnel attribute.

A time-measuring instrument can respectively measure the time (T1) that has elapsed since the received position signals have once again exceeded a predetermined signal quality and/or the vehicle position no longer features a tunnel attribute. The tunnel mode can be only deactivated in a time-delayed fashion by the display control once the measured time (T1) has exceeded a predetermined time delay (Z1). The time-measuring instrument can respectively measure the time (T2) that has elapsed since the received position signals have dropped below a predetermined signal quality and/or the vehicle position features a tunnel attribute, the tunnel mode only activated in a time-delayed fashion by the display control once the measured time (T2) has exceeded a predetermined time delay (Z2). The time-measuring instrument respectively can be measure the time (T3) that has elapsed since the tunnel mode was activated, the tunnel mode only deactivated in a time-delayed fashion by the display control once the measured time (T3) has exceeded a predetermined time delay (Z3). The time-measuring instrument respectively can measure the time (T4) that has elapsed since the tunnel mode was deactivated, the tunnel mode only activated in a time-delayed fashion by the display control once the measured time (T4) has exceeded a predetermined time delay (Z4). At least two different time delays (Z1, Z2, Z3, Z4) can be monitored parallel to one another, the tunnel mode only activated or deactivated in a time-delayed fashion by the display control once at least two measured times (T1, T2, T3, T4) have exceeded the respectively assigned time delays (Z1, Z2, Z3, Z4). A combination of the time delays (Z1, Z2, Z3, Z4) in a paired fashion can be only possible for the paired combinations of time delays (Z1, Z4) and (Z2, Z3). At least one time delay (Z1, Z2, Z3, Z4) can be configured by the user. One or more time delays (Z1, Z2, Z3, Z4) can also assume the value 0.

The tunnel-dependent display control can be switched off by inputting a user command. The manner of illustrating the tunnel mode and/or the nighttime mode can be configured by the user. The brightness and/or the color scheme can be regulated with a soft transition during the activation and/or the deactivation of the tunnel mode and/or the nighttime mode. The device can be connected to at least one functional component of a vehicle, particularly that the device exchanges data with the vehicle control via a vehicle bus, wherein a corresponding signal is forwarded from the device to the functional component of the vehicle when it is detected that the vehicle enters and/or exits a tunnel. The dimmed headlights and/or the ventilation and/or the windshield wipers and/or the instrument background lighting can be influenced in dependence on the tunnel signal of the device.

According to an embodiment, the vehicle position can be continuously determined with consideration of the received position signals. The tunnel mode of the display unit, i.e., a lower monitor brightness or a change of the monitor color scheme, can be activated automatically as soon as the vehicle position carries a tunnel attribute and the received position signals fall short of a predetermined signal quality. The signal quality of the received position signals is dependent on the number of GPS-satellites visible from the vehicle, as well as the satellite constellation that is reflected in the so-called HDOP-value (horizontal dilution of position). If the minimum number of 3 satellites is not reached and/or a limiting value for the HDOP-value is exceeded, it is advantageous to incorporate a GPS-signal quality parameter, for which a limiting value is defined, wherein the signal quality is defined as insufficient once said limiting value is reached. This ensures that the shielding of the vehicle by a tunnel causes a significant jump in the signal quality of the received position signals. In this case, the tunnel mode can be activated immediately once both conditions are fulfilled. However, it would also be conceivable to realize variations of the method, in which the activation of the tunnel mode takes place in a time-delayed fashion after both conditions are fulfilled.

The monitor color scheme for the tunnel mode and the non-tunnel mode may include the utilization of certain colors as well as other background graphics, the thickness of lines, filling patterns of surfaces, etc. These color schemes are also referred to as "skins" and, in one advantageous embodiment, can be configured or selected by the user such that various color schemes/skins are available and can be assigned to the individual modes (tunnel mode, nighttime mode, daytime mode).

The change-over between the modes may furthermore be realized without transition or with a soft transition such that, e.g., intermediate shades for the light intensity and the color shades of the color scheme are calculated and illustrated in rapid succession in order to create a dimming effect.

In comparison with solutions that utilize a light sensor, the inventive method provides the advantage that it can be realized in a purely software-based fashion such that no additional hardware expenses arise. The method is also hardware-independent and therefore can be adapted to various devices and different hardware. It is also ensured that the activation and deactivation of the tunnel mode are not subject to external ambient influences.

In comparison with solutions in which the change-over of the tunnel mode takes place solely in dependence on the identification of the vehicle position in a tunnel the inventive method provides the advantage that fewer or no erroneous deactivations occur due to extrapolation errors because both conditions need to be fulfilled for the change-over of the tunnel mode. A high process reliability of the tunnel-dependent display control therefore is ensured. The loss of the GPS-signal and the associated drop below the predetermined signal quality is very suitable for reliably identifying a tunnel entry. An erroneous change-over into the tunnel mode, in particular, due to inaccurate tunnel attributes or in very short tunnels that essentially do not require a change-over is prevented.

In order to respectively create defined initial conditions for the operation of the navigation device, it is particularly advantageous to respectively deactivate the tunnel mode automatically when the navigation device is restarted, for example, if the navigation device was switched off or set into the standby mode. This automatically ensures that the tunnel mode is respectively deactivated after the navigation device is restarted.

Aside from the tunnel mode, the display control may also feature other illumination schemes for the display unit. It would be conceivable, for example, to realize a nighttime mode and a daylight mode. In order to respectively restore the correct adjustments of the display unit after the vehicle exits a tunnel, it is particularly advantageous to respectively activate the adjustments that applied before the activation of the tunnel mode. For example, if the vehicle enters a tunnel in the nighttime mode, the nighttime mode should also be reactivated after the vehicle exits the tunnel. In practical applications, this means that the user cannot recognize the change-over between the nighttime mode and the tunnel mode if the adjustments of the display unit in the tunnel mode correspond to the adjustments of the display unit in the nighttime mode. On the other hand, the nighttime mode may merely consist of a reduced light intensity while the tunnel mode also causes a change of the color scheme or vice versa. Alternatively, it would also be conceivable that it is impossible to activate the tunnel mode when the nighttime mode is activated and/or to deactivate the tunnel mode when the nighttime mode is activated as the vehicle exits a tunnel.

The inventive method primarily pertains to the activation of the tunnel mode when entering a tunnel. However, this also raises the question when and under which conditions the tunnel mode should be deactivated again. Three different variations of a corresponding method are proposed in this respect.

According to the first variation of the method for deactivating the tunnel mode, it is respectively checked if the determined vehicle position no longer carries a tunnel attribute and if the received position signals exceed a predetermined signal quality. The tunnel mode is only deactivated again when both conditions are fulfilled. This variation of the method for deactivating the tunnel mode ultimately corresponds to the activation strategy, in which both conditions are also respectively checked. Analogous to the activation of the tunnel mode, the deactivation of the tunnel mode may either take place immediately when both conditions are fulfilled or with a certain time delay.

As an alternative to checking both conditions, it would also be conceivable to monitor only the signal quality of the received position signals for the deactivation of the tunnel mode, wherein the deactivation of the tunnel mode takes place as soon as the signal quality exceeds a predetermined value, namely without taking into consideration the determined vehicle position. This variation of the method provides the advantage that inaccuracies in the determined vehicle position as they occur due to the lacking position signal in a tunnel are not taken into consideration such that the deactivation always takes place exactly at the time, at which the position signal, particularly the GPS-signal, once again has a sufficient signal strength. At this time, it can be reliably assumed that the vehicle has already exited the tunnel again or is about to reach the end of the tunnel.

Alternatively, the deactivation of the tunnel mode may also take place in dependence on the determined vehicle position only as proposed in a third variation of the method. This variation of the method is particularly advantageous if the vehicle position in the tunnel can be determined with sufficient accuracy without an evaluation of position signals, namely by means of extrapolation methods and/or the evaluation of other position finding sensors. This precludes errors in the deactivation of the tunnel mode as they occur, for example, due to the irradiation of the GPS-signal into the end section of the tunnel.

One significant problem in the activation and deactivation of the tunnel mode in practical applications can be seen in that the change-over takes place with an excessively high frequency, i.e., excessively direct. This problem arises, in particular, if the conditions evaluated for the activation or deactivation of the tunnel mode change very frequently. In order to avoid this problem, it is particularly advantageous if the activation or the deactivation respectively takes place with a certain time delay such that change-over conditions which change with an excessively high frequency can be blanked out in this fashion.

According to a first variation of the method for the delayed deactivation of the tunnel mode, a time-measuring instrument respectively measures the time that has elapsed since the received position signals have once again exceeded a predetermined signal quality. The tunnel mode is not deactivated until the measured time has exceeded a predetermined time delay. This precludes a constant change-over of the display between the normal mode and the tunnel mode in tunnel situations that change very frequently.

Alternatively or additionally, it is also possible to respectively measure the time that has elapsed since the received position signals have dropped below a predetermined signal quality. This precludes the activation of the tunnel mode when the vehicle enters a tunnel, for example, if the tunnel is only very short and the position signal has very quickly reached a sufficient signal quality again.

In the activation or deactivation of the tunnel mode, it is furthermore possible to respectively measure the time that has elapsed since the tunnel mode was respectively activated or deactivated. The tunnel mode can only be deactivated or activated when this time exceeds a time delay predetermined in the system. A constant flickering change-over of the display therefore is precluded.

The individual time delays can be monitored independently of one another. It is particularly convenient if at least two different time delays are monitored parallel to one another, wherein the tunnel mode is only activated by the display control in a time-delayed fashion when all monitored times have exceeded the respectively assigned time delays.

Since the time delays represent a convenience characteristic, it is particularly advantageous if they can be configured by the user.

According to one preferred variation of the method, the tunnel-dependent display control can also be switched off by inputting a user command such that the user has the option of completely deactivating the tunnel-dependent display control.

Another field of application for the described variations of the method for detecting when a vehicle enters or exits a tunnel are navigation devices that are connected to the vehicle bus—as it is common practice with permanently installed navigation devices—or are otherwise in contact with vehicle devices and exchange data with the vehicle. In such instances, a signal can be transmitted to these vehicle devices when it is detected that the vehicle enters a tunnel such that these vehicle devices can also be set into a tunnel-specific mode or the tunnel-specific mode is deactivated again when it is detected that the vehicle exits the tunnel. This may pertain, for example, to respectively switching the dimmed headlights on or off, to reducing the vehicle ventilation in the tunnel, to deactivating the windshield wipers or to reducing the instrument background lighting.

With respect to these vehicle devices, the mode of the individual components before the tunnel entry is restored after the vehicle exits the tunnel analogous to the above-described method or, if the mode before the tunnel entry exactly corresponds to the tunnel-specific mode (e.g., dimmed headlights are already switched on), the detected entry or exit into/from a tunnel results in no changes. This check needs to be carried out individually for each component.

One embodiment of the invention is schematically illustrated in the figures and described in an exemplary fashion below.

DETAILED DESCRIPTION OF THE EXAMPLE EMBODIMENTS

Figure 1:
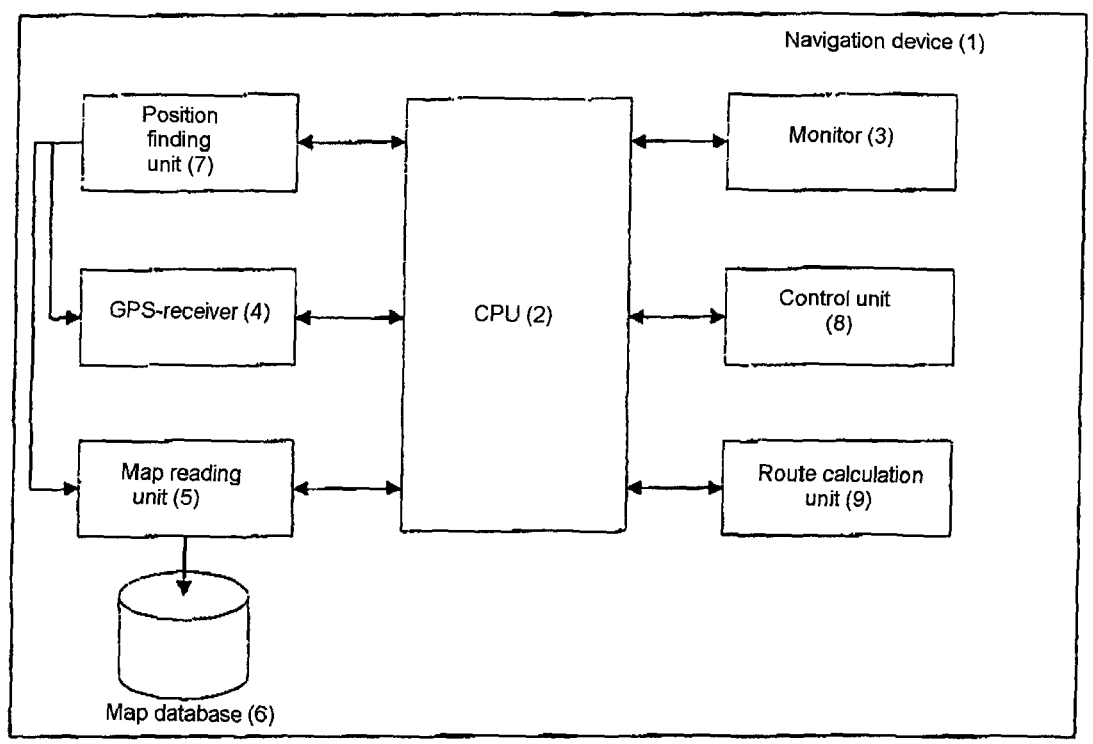
FIG. 1 is a schematic design of a navigation device for carrying out embodiments of the present invention.

The design of a navigation device for carrying out the inventive method is illustrated in an exemplary fashion in FIG. 1, wherein not all arguments shown are absolutely imperative for carrying out the inventive method.

The navigation device 1 contains a processor 2 (CPU) that serves as the central processing unit and is realized in the form of one structural unit or distributed over different components. It would also be possible to provide several processors, wherein separate processors are frequently used, in particular, for the monitor control. The display control for adjusting the display unit may be realized as part of the processor in the form of a software program.

A monitor 3 serves for illustrating a road map, a route and preferably a status display, e.g., of car functions, the GPS-status, etc. Control elements can be displayed on the monitor 3 in combination with a control unit 8 that, for example, is realized in the form of a touch screen, wherein the active areas on the monitor surface are pressure-sensitive and therefore able to accept inputs.

A GPS-receiver 4 makes it possible to receive position signals from several orbiting satellites and to precisely calculate its own position based on the time differences between the signals. The utilization of other satellite-based position finding systems such as, for example, GLONASS or Galileo, naturally is also possible and forms part of the invention. In addition to the GPS-receiver 4, the navigation device 1 may also be equipped with other sensors that are able to determine the position of the vehicle even more precisely or make it possible to determine the position at all if no GPS-signal can be received, namely by means of extrapolation methods.

A map reading unit 5 represents the access interface for all map-related actions of the navigation system and accesses a map database 6. The map database 6 may be stored on an external storage medium such as, for example, a CD, a DVD or a rewritable flash memory, e.g., an SD-card, as well as on a hard drive or other internal storage means. The map reading unit makes available a so-called Data Access Library that can be used by other components of the navigation system. It is imperative that the map database contains position data on tunnels that are referred to as tunnel attributes, if applicable, also in compressed form in connection with bridges (brunnels).

The current position of the vehicle is determined by means of a position finding unit 7. For this purpose, the current position is obtained from the GPS-receiver 4 or one or more extrapolation devices. Optionally, positions determined so far, namely a so-called position track, as well as map elements determined during the last position finding and a route calculated by a route calculation unit 9, may also be used for the positioning.

Based on the available information, the map reading unit determines the element on which the vehicle is currently traveling from the map database together with all associated data. If the determined position element of the map database consists of an element that carries a tunnel attribute or no longer features a tunnel attribute, the tunnel mode for adjusting the monitor 3 is activated or deactivated in dependence on the signal quality of the GPS-signals received by the GPS-receiver 4.

Figure 2:
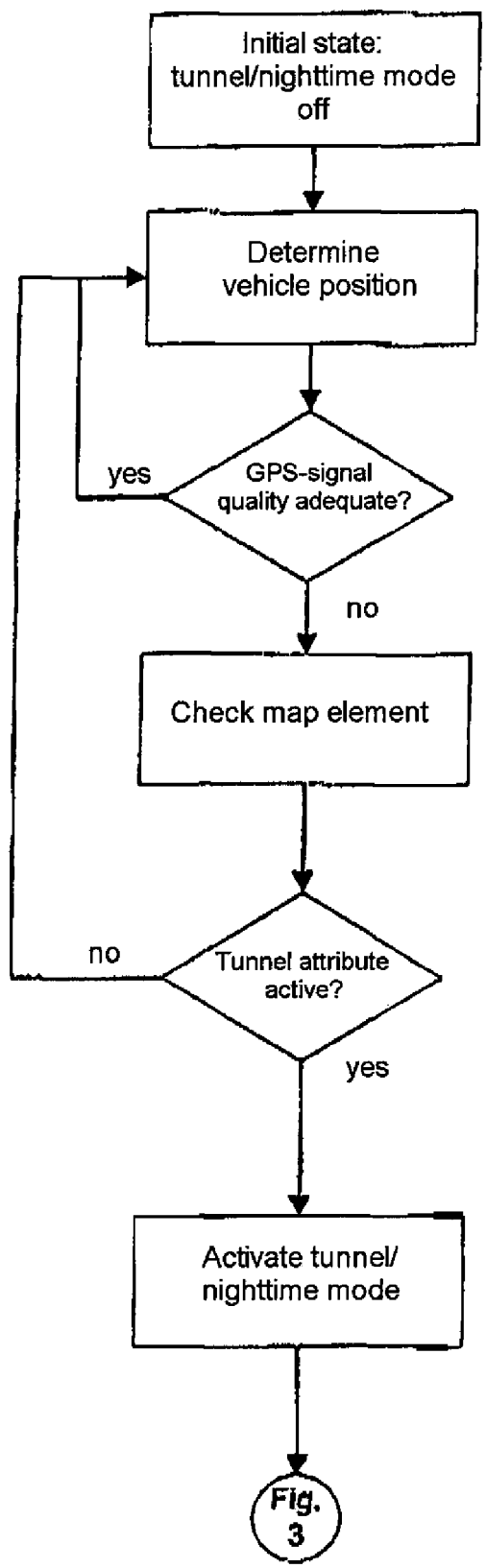
FIG. 2 is a flow chart for the activation of the tunnel mode.

FIG. 2 shows a simplified flow chart of the automatic change-over from the daylight mode into the tunnel mode. This change-over is carried out by a display control that may be realized on the CPU 2 of the navigation device 1.

When the device is switched on, the tunnel mode is automatically deactivated. During the operation of the navigation device 1, the position finding unit 7 or the GPS-receiver 4 determines the current vehicle position continuously or cyclically, i.e., in rapid succession such as, for example, several times per second. It is simultaneously determined if the GPS-signals have a sufficient quality, i.e., if the received GPS-signals exceed a predetermined signal quality. As long as the GPS-signals have a sufficient signal quality, the determination of the vehicle position is respectively continued and the display control remains in the initial state, namely the activated daytime mode.

As soon as the check of the GPS-status shows that the GPS-signal has dropped below a predetermined signal quality, it is checked in another step if the map element that identifies the current vehicle position carries a tunnel attribute. If no tunnel attribute is present, it is assumed that the GPS-signal is not attenuated by a tunnel such that the normal determination of the vehicle position continues. However, if the determined map element features a tunnel attribute, the system assumes that the attenuation of the GPS-signal is caused by a tunnel. In this case, the display control automatically activates the tunnel mode such that, for example, the brightness of the display is reduced or the color scheme is shaded in order to prevent the user from experiencing a glare effect in the tunnel. An optional time delay, e.g., as provided for the deactivation in FIG. 3, can also be used for the activation of the tunnel mode.

Figure 3:
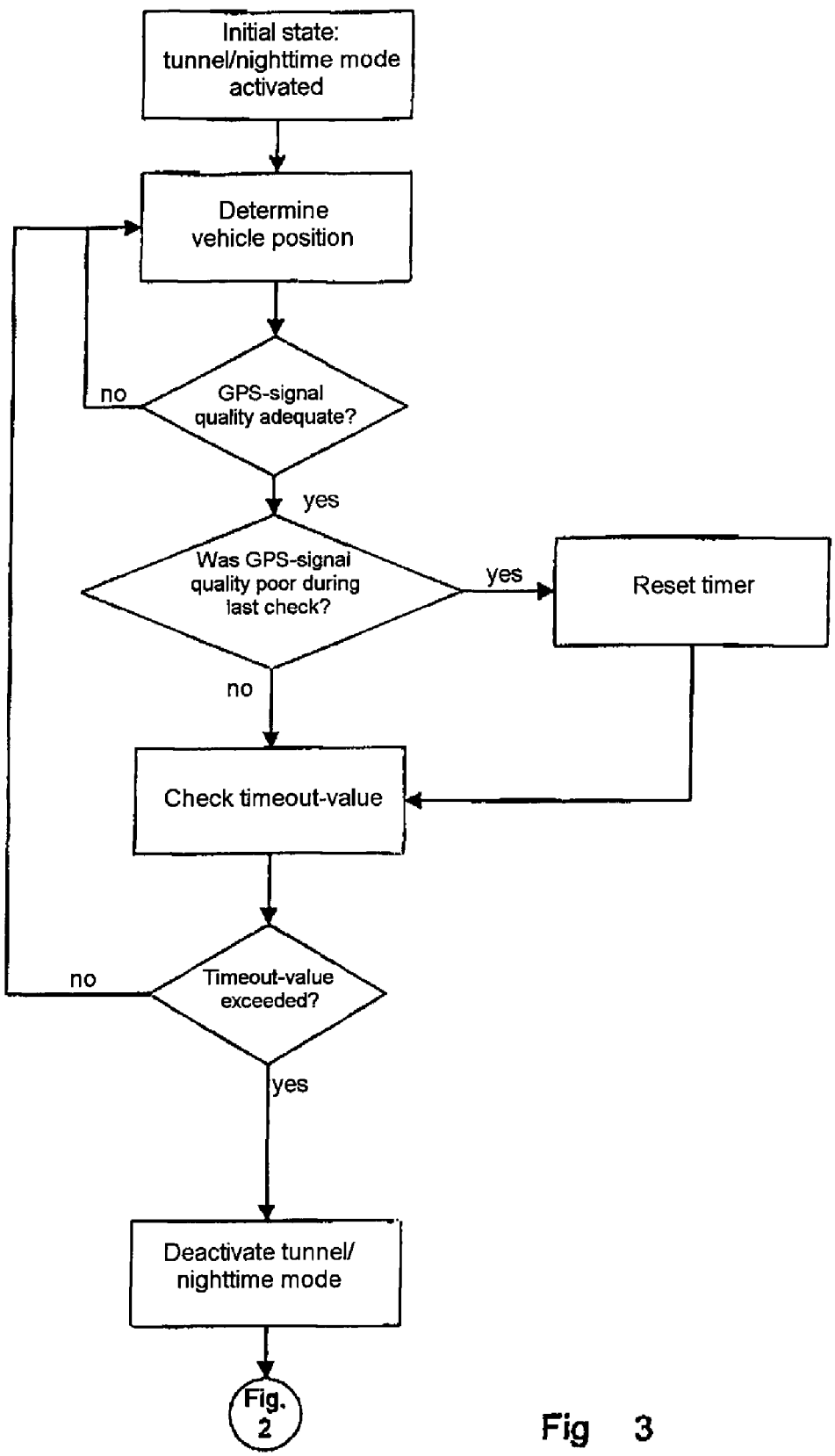
FIG. 3 is a flow chart for the deactivation of the tunnel mode.

After the activation of the tunnel mode, a software routine according to the schematic flowchart in FIG. 3 is started. The respective vehicle position is once again determined, for example, by means of extrapolation methods with consideration of the vehicle acceleration, and the signal quality of the received GPS-signals is simultaneously monitored. As long as the signal quality of the received GPS-signals falls short of the predetermined signal quality, it is assumed that the vehicle is still situated in the tunnel and the tunnel mode remains activated. A deactivation of the tunnel mode is only possible when the received GPS-signals have a sufficient signal quality. However, the deactivation of the tunnel mode does not take place directly and immediately, but rather after checking a time delay, i.e., the time that has elapsed since the GPS-signal quality has once again exceeded the configured signal quality. This is achieved by resetting the timer for the time delay after the initial detection of an adequate GPS-signal quality. The tunnel mode is not deactivated as long as the time of the timer does not exceed the configured time delay. This is the reason why another check of the GPS-signal quality is carried out. At this point, it is possible that the GPS-signal once again exceeds the required signal quality, e.g., during a short interruption of the tunnel. This does not lead to the deactivation of the tunnel mode in this short interruption. However, if the vehicle would actually have exited the tunnel and be situated on an unobstructed road segment, i.e., if the predetermined signal quality is permanently exceeded, this is detected after the expiration of the configured time delay and the tunnel mode can be deactivated again. Subsequently, the flowchart illustrated in FIG. 2 is started again.

In the flow chart for deactivating the tunnel mode illustrated in FIG. 3, the deactivation of the tunnel mode is dependent on a combined check of the GPS-signal quality and the time delay.

The invention claimed is:

1. A method for operating a device, particularly a navigation device for a motor vehicle, wherein the device comprises a processor, a signal receiver for receiving position signals, particularly GPS-signals, a road network database that also contains position data on tunnels (tunnel attributes), a position finding unit that determines the current position of the vehicle, a display unit and a display control for controlling the adjustments of the display unit, particularly for regulating the brightness and/or a color scheme of the display unit, wherein the display control is able to change the adjustment of the display unit while driving through a tunnel (tunnel mode), the method comprising:
   a) determining the vehicle position with consideration of the received position signals;
   b) automatically activating the tunnel mode of the display unit by means of the display control immediately or with a certain time delay if the determined vehicle position features a tunnel attribute and the received position signals fall short of a predetermined signal quality.

2. The method of claim 1, wherein the tunnel mode of the display control is automatically deactivated when the navigation device is restarted and/or when the navigation device is activated from the standby-mode.

3. The method of claim 2, wherein the display control activates the adjustments of the display unit that applied before the last activation of the tunnel mode after the tunnel mode is deactivated.

4. The method of claim 1, wherein the adjustments of the display unit while driving through a tunnel (tunnel mode) correspond to the adjustments of the display unit during nighttime hours (nighttime mode) and/or that the tunnel mode cannot be activated when the vehicle enters a tunnel while the nighttime mode is activated and/or that the tunnel mode cannot be deactivated when the vehicle exits a tunnel while the nighttime mode is activated.

5. The method of claim 1, wherein only the brightness of the display unit is regulated when activating the nighttime mode.

6. The method of claim 1, wherein the tunnel mode of the display unit is deactivated by the display control immediately or with a certain time delay if the received position signals exceed a predetermined signal quality and the determined vehicle position no longer features a tunnel attribute.

7. The method of claim 6, wherein the vehicle position in the tunnel is determined without evaluating position signals by means of an extrapolation method and/or by evaluating other sensors, wherein the tunnel mode of the display unit is deactivated by the display control immediately or with a certain time delay if the vehicle position determined by means of extrapolation no longer features a tunnel attribute and the received position signals exceed a predetermined signal quality.

8. The method of claim 1, wherein the tunnel mode of the display unit is deactivated by the display control immediately or with a certain time delay if the received position signals exceed a predetermined signal quality, wherein the determined vehicle position is not taken into account in the deactivation of the tunnel mode.

9. The method of claim 1, wherein the tunnel mode of the display unit is deactivated by the display control immediately or with a certain time delay if the determined vehicle position no longer features a tunnel attribute, wherein the received signal quality of the position signals is not taken into account in the deactivation of the tunnel mode.

10. The method of claim 9, wherein the vehicle position in the tunnel is determined without evaluating position signals by means of an extrapolation method and/or by evaluating other sensors, wherein the tunnel mode of the display unit is deactivated by the display control immediately or with a certain time delay if the vehicle position determined by means of extrapolation or by evaluating other sensors no longer features a tunnel attribute.

11. The method of claim 1, wherein a time-measuring instrument respectively measures the time (T1) that has elapsed since the received position signals have once again exceeded a predetermined signal quality and/or the vehicle position no longer features a tunnel attribute, wherein the tunnel mode is only deactivated in a time-delayed fashion by the display control once the measured time (T1) has exceeded a predetermined time delay (Z1).

12. The method of claim 11, wherein the time-measuring instrument respectively measures the time (T2) that has elapsed since the received position signals have dropped below a predetermined signal quality and/or the vehicle position features a tunnel attribute, wherein the tunnel mode is only activated in a time-delayed fashion by the display control once the measured time (T2) has exceeded a predetermined time delay (Z2).

13. The method of claim 12, wherein the time-measuring instrument respectively measures the time (T3) that has elapsed since the tunnel mode was activated, wherein the tunnel mode is only deactivated in a time-delayed fashion by the display control once the measured time (T3) has exceeded a predetermined time delay (Z3).

14. The method of claim 13, wherein the time-measuring instrument respectively measures the time (T4) that has elapsed since the tunnel mode was deactivated, wherein the tunnel mode is only activated in a time-delayed fashion by the display control once the measured time (T4) has exceeded a predetermined time delay (Z4).

15. The method of claim 14, wherein at least two different time delays (Z1, Z2, Z3, Z4) are monitored parallel to one another, wherein the tunnel mode is only activated or deactivated in a time-delayed fashion by the display control once at least two measured times (T1, T2, T3, T4) have exceeded the respectively assigned time delays (Z1, Z2, Z3, Z4).

16. The method of claim 15, wherein a combination of the time delays (Z1, Z2, Z3, Z4) in a paired fashion is only possible for the paired combinations of time delays (Z1, Z4) and (Z2, Z3).

17. The method of claim 14, wherein at least one time delay (Z1, Z2, Z3, Z4) can be configured by the user.

18. The method of claim 16, wherein one or more time delays (Z1, Z2, Z3, Z4) can also assume the value 0.

19. The method of claim 1, wherein the tunnel-dependent display control can be switched off by inputting a user command.

20. The method of claim 1, wherein the manner of illustrating the tunnel mode and/or the nighttime mode is configured by the user.

21. The method of claim 1, wherein the brightness and/or the color scheme are regulated with a soft transition during the activation and/or the deactivation of the tunnel mode and/or the nighttime mode.

22. The method of claim 1, wherein the device is connected to at least one functional component of a vehicle, particularly that the device exchanges data with the vehicle control via a vehicle bus, wherein a corresponding signal is forwarded from the device to the functional component of the vehicle when it is detected that the vehicle enters and/or exits a tunnel.

23. The method of claim 22, wherein the dimmed headlights and/or the ventilation and/or the windshield wipers and/or the instrument background lighting are influenced in dependence on the tunnel signal of the device.

* * * * *